Oct. 20, 1953 — W. F. HUCH — 2,656,293
MULTIPLE GORE BALLOON MANUFACTURING PROCESS
Filed Dec. 5, 1951 — 3 Sheets-Sheet 1
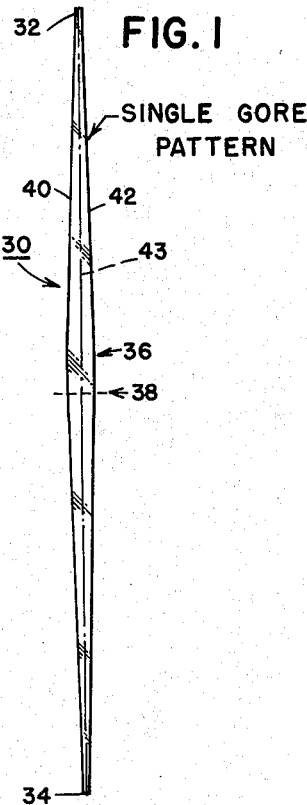
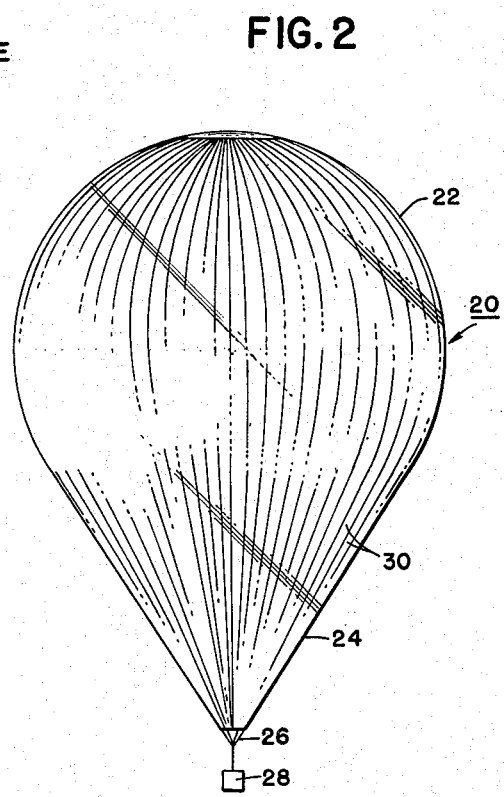
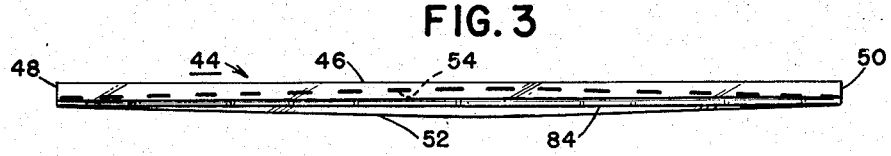
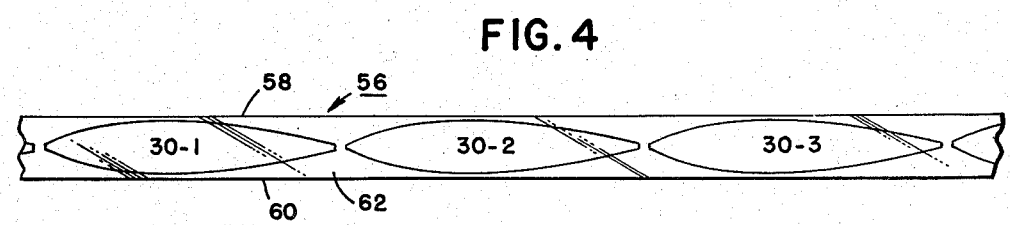
INVENTOR
WILLIAM F. HUCH
BY William C. Babcock, ATTORNEY

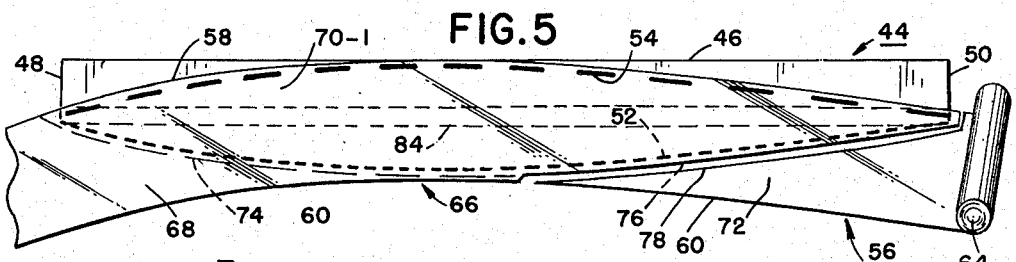

Oct. 20, 1953 W. F. HUCH 2,656,293
MULTIPLE GORE BALLOON MANUFACTURING PROCESS
Filed Dec. 5, 1951 3 Sheets-Sheet 3
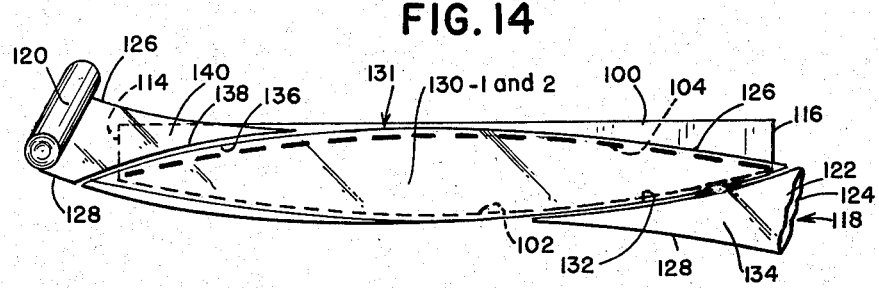
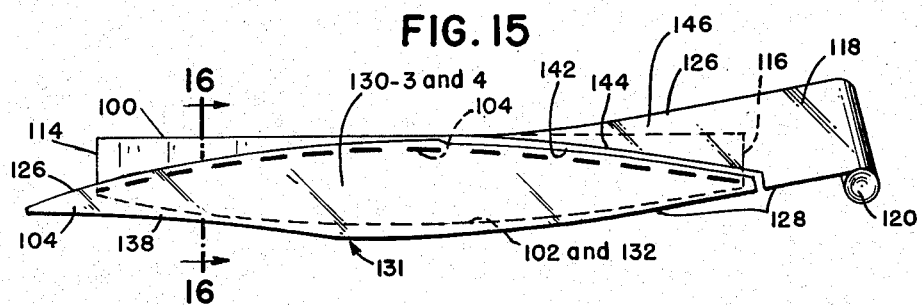
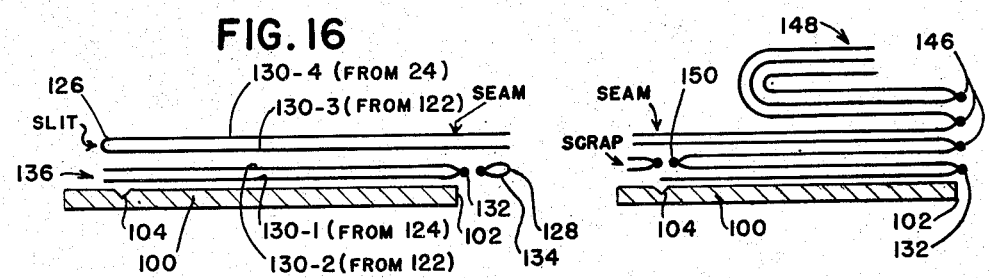
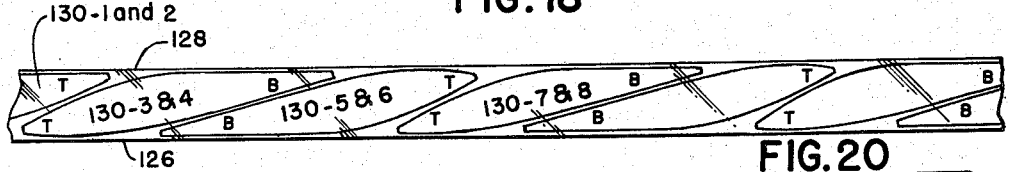
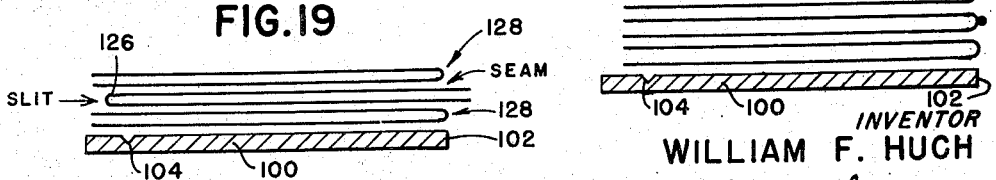
INVENTOR
WILLIAM F. HUCH
BY William C. Babcock ATTORNEY Patented Oct. 20, 1953

2,656,293

UNITED STATES PATENT OFFICE 2,656,293

MULTIPLE GORE BALLOON MANUFACTURING PROCESS

William F. Huch, St. Paul, Minn., assignor to General Mills, Inc., a corporation of Delaware Application December 5, 1951, Serial No. 259,978

14 Claims. (Cl. 154—85)

This application relates to a process of manufacturing multiple gore balloons and, more particularly, to improved methods of forming successive gores from a continuous strip of thin gas proof sheet material.

Balloons have been developed in which the balloon body is formed from a plurality of individual gores of thin sheet material joined together at their adjacent edges. Certain balloons of this type are disclosed and claimed in United States Patent 2,526,719, assigned to the same assignee as the present invention. Thermoplastic sheet materials of the type preferred for the manufacture of such balloons constitute a major portion of the cost of the finished product. Because the gores generally taper or curve from a wide intermediate point toward both ends of the usual gore pattern, previous methods of forming such gores have required the use of substantial amounts of material, much of which has been wasted.

In this connection, it has been thought necessary to cut the gores parallel to the longitudinal axis of the strip material from which they are made in order that the direction of orientation of the gore with respect to the axis of the strip would be the same in all cases and would correspond to the direction of extrusion of the material during its manufacture.

One object of the present invention is to provide an improved method for the manufacture of multiple gore balloons from continuous strip material.

A further object is the provision of an improved method of cutting successive gores from such a strip.

Another object is a method of forming individual balloon gores in which at least one straight edge of a continuous strip of gore material is bent or distorted to constitute the curved edge of the completed gore.

A still further object is the provision of a method of forming successive gores from strip material in which the individual gores may be overlapped longitudinally with a minimum wastage of material.

Another object is a method of forming successive gores with the aid of a pattern corresponding to the shape of a complete gore, the gore material and pattern being superimposed in a novel manner during the formation of both individual and successive gores.

Still another object is a balloon manufacturing process in which tubular sheet material is utilized.

A further object is a method of forming gores from tubular sheet material in which certain of the successive gores are integrally connected at portions of their curved edges by the folded edges of the original strip material.

Other objects and advantages of the present invention will be apparent from the following specification in which certain preferred embodiments of the invention are described.

In the drawings forming a part of this application and referred to in the following description, Figure 1 is a plan view of a typical single gore pattern as formed in the present invention.

Fig. 2 is a view of a completed balloon made from a plurality of individual gores of the type shown in Fig. 1.

Fig. 3 is a top view of a balloon assembling table or gore pattern table in connection with which the present invention may be practiced.

Fig. 4 is a plan view showing the manner in which individual gores have been cut from flat sheet material according to one prior art method of manufacture.

Fig. 5 is a plan view showing the first step in one process of gore formation according to the invention.

Fig. 6 is a view similar to Fig. 5 showing the application of the gore material and pattern during the next step of the process.

Fig. 7 is a sectional view on the line 7—7 of Fig. 6 showing the manner in which the first two gore layers are laid out.

Fig. 8 is a view similar to Fig. 7 showing the material at a subsequent step in the process.

Fig. 9 is a view similar to Figs. 7 and 8 showing a still later step of the method.

Fig. 10 is an exaggerated plan view showing the manner in which the successively formed gores are cut in longitudinally overlapping relation from the strip.

Fig. 11 is an exaggerated plan view showing schematically the manner in which the original strip material is effectively distorted to the desired shape in the finished product.

Figs. 12 and 13 are views similar to Figs. 7 and 9, of a modified pattern and process according to a preferred form of the invention with single layer sheet material.

Fig. 14 is a view similar to Fig. 5 of the initial step in a preferred process of forming successive gores from tubular sheet material.

Fig. 15 is a view of a subsequent step in the process of Fig. 14.

Fig. 16 is a sectional view on the line 16—16 of Fig. 15 showing the arrangement of the layers at an early point in the process.

Fig. 17 is a view similar to Fig. 16 showing the arrangement of the layers at a later point in the process.

Fig. 18 is an exaggerated schematic view showing the manner in which the successive gores are cut from the tubular strip material according to the process of Figs. 14 through 17, and Figs. 19 and 20 are views similar to Fig. 16 showing successive steps in an alternate process using tubular material.

With reference first to the prior art in this field, Fig. 2 shows a completed balloon 20 of one general type which can be made according to this process. This balloon is of the general shape described in the above Winzen patent and includes a spherical main body portion 22, a conical lower body portion 24, load lines 26, and a load 28 suspended from the balloon. The balloon body is made of a plurality of vertically extending gores 30, the shape of an individual gore of this type being shown in Fig. 1.

The individual gores 30 shown in Fig. 1 taper toward the top end 32 and the bottom end 34 from an intermediate point 36 of maximum width. Because of the particular shape of the balloon shown in Fig. 2 this point 36 of maximum width is unsymmetrically located with respect to the longitudinal midpoint 38 of the gore. Thus, in this case, the widest point 36 is nearer the top 32 of the gore. The edges 40 and 42, respectively, of the gore taper or curve gently and smoothly from the point of maximum width 36 toward the upper and lower ends 32 and 34. These curved edges 40 and 42 in the particular pattern shown in Fig. 1 are symmetrically spaced at all points from the longitudinal center line or axis 43 of the gore. Thus the particular gore which is illustrated has its edges curved symmetrically with respect to the longitudinal axis of the gore, while the gore itself is unsymmetrical with respect to a transverse axis at its midpoint 38.

In the past it has been suggested that such gores be formed and assembled with the aid of a pattern or balloon manufacturing table of the type shown generally in Fig. 3. Such a pattern table, and a method of manufacturing balloons using it, are described and claimed in the copending application of LaMere, et al., Serial No. 18,585, filed April 2, 1948, and assigned to the same assignee as the present invention. Here the balloon table 44 has one straight longitudinal edge 46 parallel to the axis of the desired gore. This straight edge 46 extends all the way between the ends 48 and 50 of the pattern or table, these ends being spaced longitudinally a distance corresponding to at least the length of the desired gore. The opposite edge 52 of the pattern or table is curved to correspond to the desired gore edge shape. To assist in the handling of the gores in accordance with the process of the above-mentioned application, the pattern or table also includes a pattern line 54 curved to correspond to the opposite edge of the desired gore.

In the apparatus of Fig. 3, the straight edge 46 is designed to facilitate the repeated laying out of material from a continuous strip. Such material is then cut and seamed to adjacent layers along lines corresponding to the curved edge 52 of the table or the curved pattern line 54.

Fig. 4 illustrates in exaggerated fashion the shape of successive gores 30—1, 30—2, and 30—3, etc., as they are cut from a continuous strip 56 of thin gas proof sheet material according to the prior art. Such material has straight parallel opposite edges 58 and 60 which are spaced apart a distance just slightly greater than the maximum width of the desired gore. As emphasized in Fig. 4, all of the gores are cut with their longitudinal axes parallel to the edges 58 and 60 of the strip material. Such an arrangement was formerly thought necessary in order to obtain gores in which the longitudinal axis was parallel to the direction in which the material was originally extruded during its manufacture. As is evident from the illustration, the formation of successive gores in this manner permits no longitudinal overlapping of portions of the gore and results in considerable waste of material at the regions 62 where the gores are relatively narrow.

According to one aspect of the present invention, it has been found that gores can be formed from a continuous strip of material by bending at least one of the straight edges of the strip material into alignment with a substantial portion of one of the curved edges of a complete gore pattern. Thus in the final gore, a substantial portion of at least one curved edge of the individual gore will consist of material which was formerly parallel to one straight edge of the strip material. The "substantial portion" thus aligned should include at least 25% of the length of one gore edge and may include up to 100% of the length of one gore edge or 50% of the total effective length of both gore edges.

Fig. 5 illustrates the first step in one process according to this invention in which an initial layer of gore material is laid out on the pattern table 46. In this case, the strip of gore material 56 is shown as supplied from a roll 64. In Fig. 5, the first gore layer is drawn from the bottom of the roll and one straight edge 58 of the strip is bent into substantial alignment with one complete curved edge of the pattern, in this case the curved edge represented by the pattern line 54. A slight overlap is illustrated in Fig. 5 for purposes of subsequent seaming.

Since the strip material 56 is only slightly wider than the desired maximum width of the final gore, there will be one point 66 at which the strip material will substantially cover the width of the pattern without extending beyond it. At the end 48 of the table corresponding to the top of the final gore, the edge 60 of the strip will extend considerably past the edge 52 of the table to provide an initial waste area 68. Since one edge 58 of the strip substantially coincides with the curved pattern edge 54, the desired initial gore 70—1 can be completed by cutting the opposite edge of the gore along a line substantially corresponding to the opposite curved edge 52 of the pattern table. Thus the advance flap or waste portion 68 is severed along the line 74, while the gore is cut from the main body of the strip along the edge 52 near the lower end 50 of the pattern table, leaving a curved gore edge portion 76 and an arcuate or curved edge 78 forming a tapered extension 72 on the remaining portion of the strip of material 56.

In this initial cutting along the lines 74 and 76 a slight overlap has again been provided for the particular seaming operation discussed below. Thus a first gore 70—1 has been formed by alignment of the original straight edge 58 of the strip with the curved pattern line 54 and by the cutting of the gore along the opposite curved edge 52 of the pattern.

Fig. 6 illustrates the next step in the process, which includes the laying out of the next layer for the formation of a second gore 70—2. In this case, prior to the laying out of the additional strip material, the roll 64 is reversed so that the material is pulled from the top of the roll rather than from the bottom as shown in Fig. 5. The purpose of this reversal is to permit alignment of the second or opposite straight edge 60 of the strip with the gore pattern line 54. In the course of such alignment, the strip 56 is advanced with respect to the pattern table 46 just sufficiently so that the tapered extension 72 at the free end of the strip of material will completely cover the upper portion of the gore pattern at the end 48.

Because of the gently curved cut edge 78 which was left on the strip from the severing of the first gore, the amount of material wasted at this upper end of the next gore layer is substantially decreased.

Fig. 7 illustrates in schematic cross section the manner in which the two layers are now superimposed. The lower gore 70—1 has one curved edge formed from the original straight edge 58 of the strip 56, while the second gore 70—2 has one of its curved edges formed from the original opposite straight edge 60 of the material, these original straight edges being in alignment with each other.

While various methods of seaming the individual gores to each other may be utilized, the present process is illustrated in connection with the use of thermoplastic sheet material and the provision of a seam between adjacent layers by a simultaneous cutting and sealing through the use of a heated member as described in the above LaMere application. Thus, in Fig. 7 the gore layers 70—1 and 70—2 will be seamed to each other along a line corresponding to the opposite curved edge 52 of the pattern by application of a heated cutting and seaming member at the point 80. The seam thus formed will correspond exactly to the curved pattern edge 52 or, in other words, to the desired curved edge shape of the final gore.

According to the process described and claimed in the above LaMere application, the initially completed seam 80 is then shifted across the table and realigned with the opposite curved pattern line 54 in the manner shown in Fig. 8. This effectively reverses the gore sheet 70—2 so that it extends across the table to the curved edge 52. For convenience in handling the previously formed layers of gore material, the pattern table 46 is provided with a central recession or depressed portion extending longitudinally of the table as illustrated at 84.

The seaming and severing of the first two layers as described above will have resulted in the severing of the second gore from the strip 56 of sheet material and will again leave a tapered end 82 (Fig. 6) on the strip. According to the present process, the supply roll 64 is again reversed and the strip advanced with respect to the pattern just sufficiently so that the tapered end 82 will cover the end of the pattern at the end 48 of the table. By reason of the reversal, the straight edge 58 will now be aligned with the curved pattern line 54 as shown in Fig. 8. The second and third gores are then seamed together along the opposite curved edge 52 of the pattern by application of heat at the point 86 to form a seam between adjacent gores.

The newly formed seam 86 is then pulled across the table to the pattern line 54, the supply roll of material is reversed, and a fourth gore is laid out with the straight edge 60 of the material substantially aligned with the pattern line 54. The third and fourth gores are then seamed together at 88 along the opposite curved pattern edge 52.

Additional gores are similarly laid out, cut, and seamed together with the supply roll reversed after the formation of each gore so that the opposite straight edges of the strip material will be alternately and successively aligned with the same pattern line 54. After the desired number of gores has been asembled and seamed together in this manner, the free edges of the first and last gores can be seamed to each other along the desired pattern line to complete the balloon body illustrated in Fig. 2.

Fig. 10 illustrates in exaggerated schematic fashion the manner in which the successive gores are cut from the strip. It is perhaps more accurate to state that Fig. 10 shows the manner in which the material for each gore would have fitted in the original strip if the gore had been left in the strip and not bent into the configuration of the gore pattern as illustrated in Figs. 5 and 6.

Fig. 11 illustrates this distortion in exaggerated fashion. Thus in this figure, the heavy lines show the material of the gore 70—1 as it originally existed in strip form, with one of the gore edges corresponding to the straight edge 58 of the strip. The dotted lines in Fig. 11 illustrate the actual gore shape after the top 92 of the original material has been in effect shifted or distorted to the symmetrical position shown in 94, with the lower portion of original material 96 similarly shifted or distorted to its new symmetrical final gore position 98.

It is apparent that when the material is laid out in the manner shown in Fig. 5, the bending of the original straight edge 58 to follow the curvature of the gore pattern line 54 will result in some fullness of material along the opposite curved edge 52 of the pattern. Because the actual gore pattern, as illustrated in Fig. 1, is relatively long and narrow and involves only a gentle curvature from the point of maximum width toward each end, the method of Figs. 5 through 9 may be used satisfactorily without introducing undesired slack at the opposite gore edges. Furthermore, it has been found according to the present invention, that certain thermoplastic sheet materials, of which polyethylene is one example, are capable of limited distortion so that the original sheet material can be effectively shifted from the heavy line to the dotted line configuration of Fig. 11 either during the actual formation of the gore as in Figs. 5 and 6 or during flight of the finished balloon.

Figs. 12 and 13 illustrate a preferred embodiment of the present invention insofar as the use of single layered strip material is concerned. According to this preferred form of the invention, a pattern or table 100 is provided having at least one edge 102 curved to correspond to the desired gore pattern edge in a manner similar to that illustrated at 52 in Fig. 5. At the opposite edge of the pattern table 100 a pattern line 104 may be provided corresponding to the curved gore edge shape which is desired just as was done in the use of the pattern line 54 in Fig. 5.

According to this preferred embodiment of the invention, successive gore layers 106—1, 106—2, etc., are laid out on the table 100 in the same manner shown in Figs. 5 and 6 with first one straight edge 58 of the continuous strip material aligned with the pattern line 104 for one gore and then with the opposite straight edge 60 of the original strip material aligned with the same pattern line 104.

In this particular embodiment of the invention, no central depressed portion is required on the table since the individual gore layers are left superimposed in their original position on the pattern during the formation of successive gores. Each pair of successive layers is seamed together at one curved edge corresponding to the curved table edge 102 as shown at 108 in Fig. 12. Thus after the desired number of gore layers has been provided, the pattern table 100 will have superimposed upon it a stack of identical, individual gore layers in which all of the gore edges which originally consisted of straight edges 58 or 60 of the material are superimposed at one edge of the pattern above the pattern line 104, while all of the gore edges which were formed by cutting or seaming the material along the opposite curved edge of the pattern will be in superimposed alignment above the table edge 102.

At this point, the alternate pairs of gore layers, i. e., those which are not already joined to each other by seams 108 in Fig. 12, may be seamed together along the pattern line 104. For convenience in handling, however, Fig. 13 illustrates a preferred manner of finishing the operation in which the complete stack of gores is reversed on the pattern table 100 with the originally formed seams 108 positioned one above the other in alignment with the curved pattern line 104. The upper layers of the stack at the opposite edge of the pattern can then be folded back as shown at 110 and the alternate pairs of free edges of adjacent gores can then be seamed together as shown at 112 along a line corresponding to the edge 102 of the pattern table.

An important advantage of the preferred embodiment illustrated in Figs. 12 and 13 is that the handling of the sheets and the resultant labor involved in the manufacture of the balloon are substantially reduced as compared to the process illustrated in Figs. 7–9. This process has the further advantage that throughout the finished balloon, all of the gore edges which were originally formed from straight edges of the strip will be seamed to similar edges of one adjacent gore, while all of the gore edges which were originally formed by cutting the strip along the pattern edge opposite to the original straight edge of the strip will be seamed to similarly cut edges of another adjacent gore. Thus any fullness which may be present in the material along the cut edges (as distinguished from the original straight edges of the strip) will be matched by a corresponding fullness in the gore edges, to which they are joined. Similarly, the original straight edges of the material will be joined to similarly formed straight edges and will thus correspond exactly in their dimensions. Hence any distortion formed by the bending of the straight edges into alignment with a curved gore pattern edge will be more readily equalized in the fully assembled final balloon. For these reasons the process of Figs. 12 and 13 represents the preferred form of practicing the present invention insofar as the use of single-layered strip material is involved.

As illustrated in Figs. 14 through 18, the present invention is particularly adaptable to the use of tubular sheet material. The use of this material is illustrated in Fig. 14 in connection with a pattern table 100, identical to that illustrated in Figs. 12 and 13. The pattern table 100 has at least one edge 102 curved to correspond to the desired gore edge configuration opposite the curved edge 102. The table includes a pattern line 104 shaped to correspond to the remaining gore edge. The pattern illustrated in Fig. 14 is designed for the manufacture of gores having their upper ends at the end 114 of the table and their lower ends at the table end 116. Thus the point of maximum width 131 of the gore pattern is somewhat nearer the upper end 114 than the lower end 116 of the table.

In this preferred embodiment of the present invention, a continuous strip 118 of tubular material is employed. Such tubular material may be supplied from a roll 120 and includes upper and lower layers 122 and 124, respectively. These upper and lower layers are connected to each other by integral folded edges 126 and 128 which constitute straight parallel, opposite edges of the tubular strip.

Fig. 14 illustrates the first step in this process in which the first portion of the tubular strip is laid out over the pattern for the formation of a first pair of complete gores 130—1 and 130—2. In superimposing the tubular material on the pattern, one of the original straight edges 126 of the material is aligned with a substantial portion of the curved gore pattern line 104 at the lower end 116 of the pattern. In the particular example illustrated, this edge 126 is in substantial alignment with the pattern line 104 from the lower end of the table to the point of maximum width 131 of the pattern.

Then, starting at substantially this point of maximum width 131 and extending to the upper edge 114 of the pattern, the opposite straight edge 128 of the tubular material is placed in substantial alignment with the corresponding portion of the opposite curved pattern edge 102. Since the width of the tubular strip of gore material is just slightly greater than the desired maximum width of the final gore, the material will not extend substantially beyond the pattern at the region 131.

In other words, the first step of the preferred process utilizing tubular material involves the superimposing of the material and the pattern with a first straight edge of the material bent into alignment with a substantial portion of the curved gore pattern edge at one end of the gore, and with the opposite straight edge of the tubular material aligned with a substantial portion of the opposite curved edge of the gore pattern at the other end of the gore. This particular method of laying out the material has not only the advantage that two gores are formed at each operation because of the use of double layered tubular material, but also has the further advantage that the amount of distortion of the originally straight tubular strip in accommodating its straight edges to the specified portions of the curved gore pattern is kept at an absolute minimum. Insofar as the method of laying out an individual gore is concerned, it should be noted that this particular orientation or superimposing of the strip on the pattern may also be used effectively with sheet material having only a single layer.

While it would be possible to use the original integral folded edge of the portion of the tubular material as the actual seam or connection between adjacent gores at certain portions along the gore edge, as described in connection with the modification of Figs. 19 and 20, it is preferable, according to the present invention, to align the material as in Fig. 14 with a slight overlap and then to sever the excess material by seaming the upper and lower layers 122 and 124 of the strip to each other at 132 along a line corresponding to the curved gore pattern edge 102. This seaming may be done in the manner previously referred to and results in the severing from the original end of the strip of a piece of scrap material 134, and in the formation of a welded or heat-sealed seam 132 extending throughout the length of the gore pattern edge 102.

Since successive gores must be seamed to preceding and successive adjacent layers alternately at opposite curved edges of the pattern, the first two gores 130—1 and 130—2 which have been partially formed by the seaming operation at 132 are now severed from the balance of the strip 118 and supply roll 120 by a simple cutting operation along the line 136 corresponding to the gore pattern line 104 at the upper end of the pattern 114. This particular severing operation provides a slight overlap and does not seam the two layers to each other. As a result of this cutting, the remaining strip of gore material is left with a gently curved or arcuate cut 138 which provides a tapered end 140 on the strip. At the same time the newly severed edges of the first two gores are now unattached to each other and are free for subsequent attachment to other adjacent layers.

As the next step in the process, the supply roll 120, which was moved from right to left in Fig. 14 during unrolling of the strip over the pattern, is rolled back in the opposite direction as shown in Fig. 15 with the tapered end 140 overlapping the gore pattern at its upper end 114 and with the straight tubular edge 126 of the strip now placed in alignment with that portion of the gore pattern line 104 extending from the upper end 114 to the region of maximum width at 131. As the material is rolled out, the opposite straight edge 128 of the tubular strip is aligned with the portion of the opposite curved edge of the gore pattern 102 extending from the region 131 to the lower end 116 of the pattern.

Thus the manner of laying out the tubular strip for the formation of the third and fourth gores 130—3 and 130—4 is substantially the same as that illustrated in Fig. 14 except that the supply strip of tubular material extends in the opposite direction so that the layer 122 is now on the bottom and the layer 124 on the top instead of the reverse. Also, it will be noted that the straight edges of the tubular strip are now in alignment with those portions of the pattern immediately opposite the portions with which the edges of the first pair of gores were aligned.

Fig. 16 illustrates the arrangements of the sheets at the section line 16—16 of Fig. 15 after the above steps have been completed. Thus it will be noted that the first two gores have been seamed together at one edge corresponding to the pattern line 102 while the third and fourth gores are partially completed as a result of the operation shown in Fig. 15.

The two layers of the strip which have just been positioned will now be seamed together along the pattern line 102 in the same way that the seam 132 was formed. These gore layers will also be severed from the strip 118 by a simple cutting operation along the line 142 substantially corresponding to that portion of the curved pattern line 104 at the lower end 116 of the pattern. This cutting operation will leave an arcuate cut 144 at the end of strip 118 and will thus provide a tapered end 146 which will be superimposed on the pattern at the lower end portion 116 as the supply roll 120 is moved in the opposite direction to repeat the step illustrated in Fig. 14. These steps, and the intermediate cutting and seaming operations, are repeated first in one direction and then in the other until the desired number of gore layers has been partially assembled in the manner shown in Fig. 16.

It will be noted in this figure that since the upper and lower layers of the tubular strip are seamed to each other along the gore pattern edge 102 in each case, it is necessary to slit the material along the opposite pattern line 104 wherever the tubular edge 126 is in alignment with the pattern in order that the layers which were previously integrally joined at this region may be seamed to other adjacent gore layers rather than to each other.

After the desired number of gore layers has been superimposed in this manner, a stack of gore layers will be obtained which may be processed further as illustrated in Fig. 17. Here the gores have been left in their original position on the pattern with each pair of layers seamed together at 146 along the gore pattern edge 102 just as was illustrated by the seam 132 of the first pair of layers. The upper layers of the stack may then be folded back out of the way as shown at 148 and a series of seams 150 formed along the gore pattern line 104 between alternate pairs of layers as shown. After these alternate pairs have been seamed, the remaining free edges of the first and last gore layers can be similarly joined to each other along the desired pattern line to complete the formation of the balloon body.

Fig. 18 illustrates in exaggerated schematic fashion the relative orientation of the successive gores when they are cut from a tubular strip of material in the manner just described. Thus each gore has a portion of one edge at one end of the gore which corresponds to one original straight edge portion of the tubular material, and a portion of the opposite gore edge at the other end of the gore which corresponded to the original opposite straight edge of the material. The reversal in direction of application of the strip between successive steps as illustrated in Figs. 14 and 15 results in the formation of successive pairs of gore layers which are oriented top-to-top and bottom-to-bottom in the continuous strip, as indicated by the letters T and B in Fig. 18. This particular orientation, and the method of processing outlined above, thus make possible the formation of a maximum number of gores with a minimum of handling and a minimum of waste of material from the continuous strip.

As pointed out above, no effort was made in the process illustrated in Figs. 14 through 18 to utilize the original integral folded edges of the tubular material as a means of connection between portions of adjacent gores. The process just described forms a separate welded or heat-sealed seam between each set of adjacent gores and thus prevents the inclusion in the final balloon of any portions of material which might be weakened or defective by virtue of having been creased tightly at the edges as the tubular material was rolled or unrolled during its formation or processing.

It is possible, however, as shown in Figs. 19 and 20, to actually utilize the folded connection between upper and lower layers of the tubular strip material as part of the connection between adjacent gores. Fig. 19 is a view similar to Figs. 16 and 17 showing the alignment of the layers after carrying out, first, the laying out step of Fig. 14, then the laying out step of Fig. 15, and then another step similar to that of Fig. 14, but with the tubular edge 128 of the strip superimposed in exact alignment with the appropriate portion of pattern edge 102 rather than with a slight overlap as previously discussed.

As a result of such processing, at the upper end of the gore illustrated by the section line 16—16 in Fig. 19, the first two gore layers will be connected to each other by the original integral folded edge 128 throughout the upper portion of the gore from the point of maximum width 131 to the upper end 114 of the pattern. The same will be true of the fifth and sixth gore layers which are positioned at the third application of the strip. The intermediate third and fourth layers formed at the second application of the strip will have separate edges which must be seamed together, as shown in Fig. 19, at this particular end of the pattern.

However, at the lower end of the pattern, the situation will be reversed and at that portion of the pattern, the intermediate or third and fourth layers will be joined by an integral folded edge portion 128 of the original strip while the first two layers and the fifth and sixth layers will be separated from each other by the cutting operation which serves the gore from the strip. These first two layers, as well as the fifth and sixth layers, must therefore be separately seamed. In this particular process, then, each pair of gore layers along the edge 102 will be integrally connected to each other from the point of maximum width to one end or the other of the gore and must be provided with a welded or heat-sealed seam from the point of maximum width to the opposite end of the gore.

At the other side of the pattern along the curved pattern line 104, the tubular edges 126 are applied with a slight overlap, so that these edges can be slit to separate the layers and permit the welding together of alternate adjacent layers along the pattern line 104, just as in the embodiment described in Figs. 14 through 18. Fig. 20 illustrates the arrangement of integral folded edge connections and seams at the edge 102 and the provision of the separated edges at the pattern line 104 after all the layers have been superimposed. A stack is thus provided in which each pair of layers is completely joined partly by an integral folded edge and partly by a separately welded seam along one edge of the pattern 102, while the separate gore layers at the opposite pattern edge 104 are available for the subsequent seaming of alternate pairs of adjacent layers, either in the manner illustrated in Fig. 17 or in the manner illustrated in Fig. 13 after reversal of the stack on the pattern.

According to the foregoing description, a number of embodiments of the present process and invention have been described which accomplish the objects set forth at the beginning of this application and which make possible the production of multiple gore balloons with a minimum of material waste and a minimum of handling. Since minor variations and changes in the exact details of construction will be apparent to persons skilled in this field, it is intended that this invention shall cover all such changes and modifications as fall within the spirit and scope of the attached claims.

Now, therefore, I claim:

1. The method of forming gores for a multiple gore balloon from a strip of thin gas proof sheet material having straight parallel longitudinal edges and a width substantially the same as the maximum desired gore width, with the aid of a pattern having the shape of a complete single gore with gently curved opposite longitudinal edges, which comprises superimposing the pattern and a portion of the strip, bending a substantial portion of one straight edge of the strip at one end of the gore pattern into alignment with a portion of the corresponding curved edge of the pattern from said one end of the gore toward substantially the point of maximum width of the gore, bending a substantial portion of the opposite straight edge of the strip at the other end of the gore pattern into alignment with a portion of the corresponding opposite curved edge of the pattern from substantially said point of maximum width toward said other end, and cutting the strip along the remaining portions of the curved edges of the pattern thereby forming and severing from the strip a completed gore.

2. The method of forming gores for a multiple gore balloon from a strip of thin gas proof sheet material having straight parallel longitudinal edges, with the aid of a pattern having the shape of a complete single gore with gently curved opposite longitudinal edges, which comprises superimposing the pattern and a portion of the strip, aligning a substantial portion of one straight edge of the strip at one end of the gore pattern with a portion of the corresponding curved edge of the pattern, aligning a substantial portion of the opposite straight edge of the strip at the other end of the gore pattern with a portion of the corresponding opposite curved edge of the pattern, and cutting the strip along the remaining portions of the curved edges of the pattern thereby forming and severing from the strip a completed gore.

3. The method of forming gores for a multiple gore balloon from a strip of thin gas proof sheet material having straight parallel longitudinal edges, with the aid of a pattern having the shape of a complete single gore with gently curved opposite longitudinal edges, which comprises superimposing the pattern and a portion of the strip, aligning a substantial portion of one straight edge of the strip at one end of the gore pattern with a portion of the corresponding curved edge of the pattern, aligning a substantial portion of the opposite straight edge of the strip at the other end of the gore pattern with a portion of the corresponding opposite curved edge of the pattern, cutting the strip along the remaining portions of the curved edges of the pattern thereby forming and severing from the strip a completed gore and simultaneously providing a tapered end on the remaining portion of the strip, superimposing the pattern and the remaining portion of the strip with a substantial portion of the original straight edge of the strip at said tapered end aligned with a pattern of the corresponding curved edge of the pattern at one end of said pattern, aligning a substantial portion of the opposite straight edge of the strip at the other end of the gore pattern with a portion of the corresponding opposite curved edge of the pattern, cutting the strip along the remaining portions of the curved edges of the pattern thereby forming and severing from the strip another completed gore and again providing a tapered end on the remaining portion of the strip, and similarly superimposing, aligning and cutting successive portions of the strip until the desired number of gores is obtained.

4. The method of forming balloon gores according to claim 3 in which the gore pattern has unsymmetrical "top" and "bottom" ends with respect to a transverse axis midway between its ends, and in which the tapered end at the remaining portion of the strip is superimposed alternately at the "top" and "bottom" ends of the pattern in the formation of successive gores, thereby severing successive gores from the strip in partial longitudinally overlapping relation with the gores oriented "top" to "top" and "bottom" to "bottom" along the strip.

5. The method of forming balloon gores according to claim 3 in which the strip of material is tubular and has upper and lower layers connected by integral folded edges, thereby forming two gores at each application of the pattern, with said gores already joined together at the curved edge portions of the pattern where a straight integral folded edge portion of the tubular material is aligned with the pattern.

6. The method of forming balloon gores according to claim 5 in which at least the remaining cut portions of the upper and lower layers of material at one curved edge of each gore are seamed together along a line corresponding to the pattern edge, and in which the integral folded edge portions at the opposite curved edge of each gore are severed thereby permitting subsequent seaming of the respective layers at said opposite gore edge to corresponding edges of the previously and subsequently formed adjacent gore layers.

7. The method of forming gores for a multiple gore balloon from a strip of thin gas proof sheet material capable of limited deformation and having straight parallel longitudinal edges, with the aid of a pattern having the shape of a complete single gore with gently curved opposite longitudinal edges, which comprises superimposing the pattern and a portion of the strip, bending at least one straight edge of the strip into alignment with a substantial portion of the corresponding curved edge of the pattern, and cutting the strip along the opposite curved edge of the pattern thereby forming and severing from the strip a completed gore.

8. The method of forming gores for a multiple gore balloon from a strip of thin gas proof sheet material having straight parallel longitudinal edges, with the aid of a pattern having the shape of a complete single gore with gently curved opposite longitudinal edges, which comprises superimposing the pattern and a portion of the strip, aligning at least one straight edge of the strip with a substantial portion including from 25% to 100% of the length of the corresponding curved edge of the pattern, and cutting the strip along the remaining curved edges of the pattern thereby forming and severing from the strip a completed gore.

9. The method of forming gores for a multiple gore balloon from a strip of thin gas proof sheet material having straight parallel longitudinal edges, with the aid of a pattern having the shape of a complete single gore with gently curved opposite longitudinal edges, which comprises superimposing the pattern and a portion of the strip, bending one straight edge of the strip into substantial alignment with one complete curved edge of the pattern, and cutting the strip along the opposite curved edge of the pattern thereby forming and severing from the strip a completed gore.

10. The method of making multiple gore balloons from a continuous strip of thin gas proof sheet material having straight parallel longitudinal edges with the aid of a pattern having the shape of a complete single gore with gently curved opposite longitudinal edges, which comprises: superimposing the pattern and a first portion of the strip, with at least a first straight edge of the strip curved into alignment with a substantial portion of one curved edge of the pattern; cutting the strip along the opposite curved edge of the pattern, thereby forming at least a first gore and severing such gore from the strip; superimposing the pattern and the next portion of the strip, with at least the second or opposite straight edge of the strip curved into alignment with a substantial portion of one curved edge of the pattern; cutting the strip along the remaining curved edge of the pattern, thereby forming another gore and severing such gore from the strip; and thereafter similarly forming successive gores by superimposing the strip and pattern with first one straight edge of the strip and then the other straight edge being aligned with a curved edge of the pattern.

11. The method of making multiple gore balloons according to claim 10 in which the severing of each gore leaves a tapered end on the remaining portion of the strip and in which the strip is advanced with respect to the pattern after each gore is formed a distance just sufficient for the tapered end to cover completely the desired end of the pattern.

12. The method of making multiple gore balloons from a continuous strip of thin gas proof sheet material having straight parallel longitudinal edges with the aid of a pattern having the shape of a complete single gore with gently curved opposite longitudinal edges, which comprises: superimposing the pattern and a first portion of the strip; bending a first straight edge of the strip into substantial alignment with one complete curved edge of the pattern; cutting the strip along the opposite curved edge of the pattern, thereby forming a first gore and severing such gore from the strip; superimposing the pattern and the next portion of the strip; bending the opposite or second straight edge of the strip into substantial alignment with one complete curved edge of the pattern; cutting the strip along the opposite curved edge of the pattern, thereby forming and severing a second gore; and thereafter similarly forming successive gores by superimposing the pattern and strip with the first and second straight edges of the strip alternately and successively aligned with a complete curved edge of the pattern.

13. The method of making multiple gore balloons according to claim 12 in which each completed gore is left superimposed on the pattern and the strip of material is reversed by rotation around its longitudinal axis before the next gore is made and in which the straight edge of the strip is always aligned with the same curved edge of the pattern, thereby forming a stack of gores on the pattern with all the gore edge portions which formerly consisted of straight edges of the strip superimposed at one edge of the pattern and with all the gore edges which were formed by cutting the strip superimposed at the opposite edge of the pattern.

14. The method of making multiple gore balloons according to claim 12 in which each gore edge which formerly consisted of a straight edge of the strip is seamed to a similar formerly-straight edge of one adjacent gore and in which each gore edge which was formed by cutting the strip along a curved pattern edge is seamed to a similarly cut edge of another adjacent gore.

WILLIAM F. HUCH.

References Cited in the file of this patent

UNITED STATES PATENTS

| Number | Name | Date |
|---|---|---|
| 2,526,719 | Winzen | Oct. 24, 1950 |